Sept. 2, 1969 A. E. LONG 3,465,138
FLASH CUBE ADAPTER FOR CAMERA
Filed Sept. 14, 1967
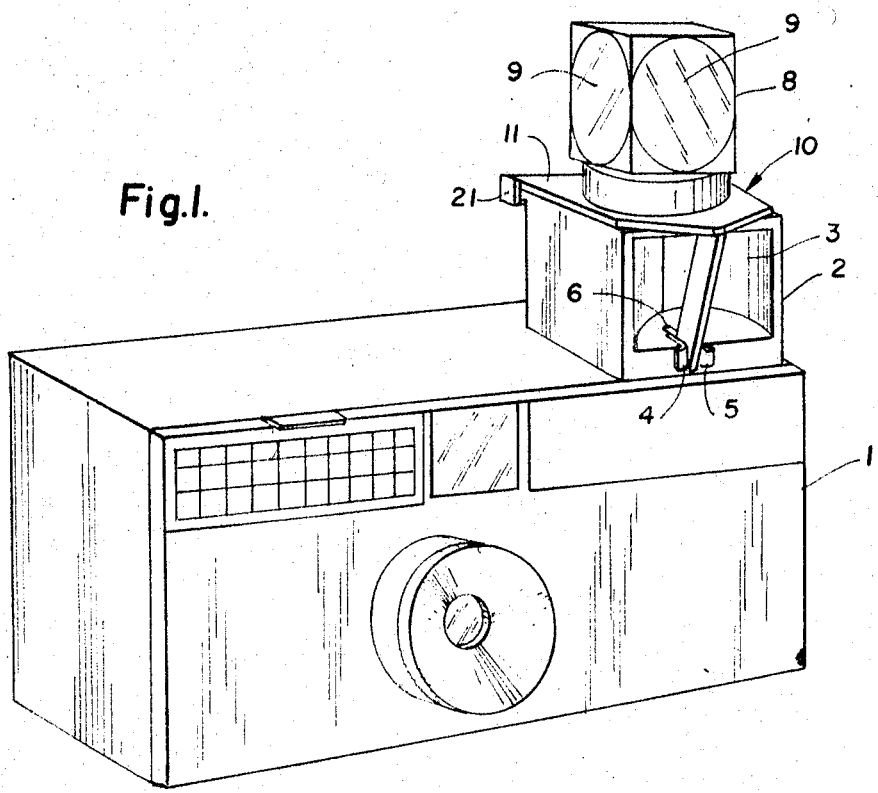
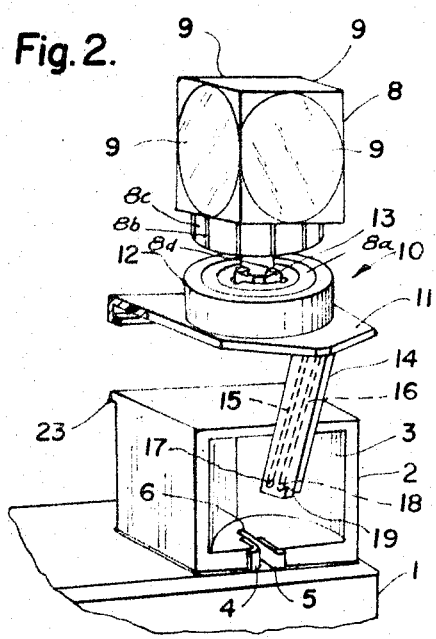
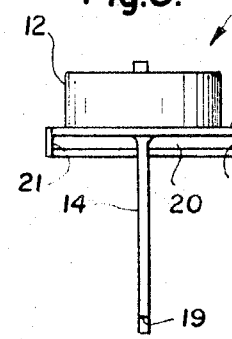
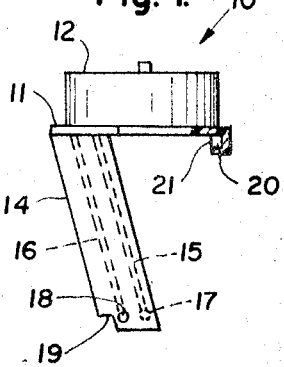
INVENTOR.
ALBERT E. LONG
BY
*William J. Ruano*
his ATTORNEY United States Patent Office 3,465,138
Patented Sept. 2, 1969

3,465,138
FLASH CUBE ADAPTER FOR CAMERA
Albert E. Long, 3832 Highland Ave.,
Shadyside, Ohio 43947
Filed Sept. 14, 1967, Ser. No. 667,781
Int. Cl. G03b 15/035
U.S. Cl. 240—1.3                                     2 Claims

ABSTRACT OF THE DISCLOSURE

An adapter for converting a camera having a built-in flash bulb unit for a single flash bulb to one using a multiple flashlamp unit having a plurality of reflectors and bulbs thereon. The adapter has a base with a circular receptacle thereon for receiving the multiple flashlamp unit, a depending leg with electrical contacts extending therealong for making contact with the spring contacts of the built-in socket on the camera, and a channel portion on the base. The top of the built-in reflector housing has a tongue portion thereon for engaging the channel portion of the adapter when it is attached to the camera. The multiple flashlamp unit is manually turned to successively place one of the unused flashlamps in the firing position.

Description of prior art

It is known in the art to provide a built-in flash bulb and reflector in a camera to enable taking of flash bulb pictures indoors. On type of camera having this built-in flash bulb reflector feature is the Instamatic by the Eastman Kodak Co. of Rochester, N.Y. There can be lifted from the top of such camera a reflector having spring contacts at the base for receiving a single flash bulb for taking a single flash picture. After flash, the burnt bulb is withdrawn from the spring contacts or socket and the reflector, which is built into a box-like housing, is pushed downwardly into the camera for taking outdoor pictures.

An outstanding disadvantage of such construction is that it enables the taking of only one flash bulb picture at a time before the flash bulb must be replaced.

It is also known in the art, in certain types of cameras, to provide a mechanism for automatically operating a flash cube, comprising four sets of reflectors and flash bulbs, each set disposed on one side of the cube and the assembly mounted on an integral circular base with four pairs of electrical contacts disposed about a circle which are adapted to be fitted into a circular groove of a stationary cube receptacle having a pair of electrical contacts which are connected to the camera operating mechanism. One disadvantage of this type of camera is that it involves a somewhat complicated and expensive mechanism in order to effect automatic partial turning of the flash cube to the next reflector and bulb after a picture is snapped.

The present invention

An object of the present invention is to provide a novel adapter which will convert the aforesaid Kodak Instamatic type camera into one which can use the flash cube described, but in a non-automatic manner, necessitating manual turning ¼ turn of the flash cube after each flash picture is taken until all four bulbs of the cube are flashed.

A more specific object of the present invention is to provide a novel adapter which may be snap fitted onto the reflector housing of a Kodak Instamatic camera to enable the use of a flash cube with such camera for taking four successive pictures before the flash cube has to be replaced.

A further object of this invention is to provide an efficient, simple and very inexpensive adapter for said purpose which can be easily and quickly installed or removed from the camera.

Other objects and advantages will become more apparent from a study of the following description taken with the accompanying drawing wherein:

FIG. 1 is a front perspective view of an Eastman Kodak Instamatic camera showing the reflector housing (without the flash bulb) in the elevated or lifted position, together with an adapter embodying the present invention to enable the use of a flash cube;

FIG. 2 is an exploded view showing the adapter separated from the cube and the reflector housing;

FIG. 3 is a front, or elevational view of the adapter embodying the present invention; and, FIG. 4 is a side view of the adapter shown in FIG. 3.

Referring more particularly to the drawing, numeral 1 denotes a Kodak "Instamatic" type camera, such as manufactured by the Eastman Kodak Co. of Rochester, N.Y., which camera, per se, forms no part of the present invention. As is well known in the art, the camera includes a box-shaped reflector housing 2 which encloses a reflector 3 so that the housing and reflector assembly may be lifted above the top of the camera, as shown in FIGS. 1 and 2, when a flash picture is to be taken, and which may be selectively pushed back into the camera until the top wall 11 is flush with the top of the camera when not needed for taking flash pictures. At the base of housing 2 forwardly of the reflector 3, there are spring contacts 4 and 5 to enable insertion of the base contacts of a single flash bulb. Electrical contact is made with an interior dry cell energized circuit upon snapping of a picture to flash the flash bulb. After each bulb is flashed it is necessary to remove the bulb and replace it with another single bulb, which is a time consuming task.

In accordance with the present invention, an adapter, generally denoted by numeral 10, is provided and which may be more clearly seen in FIG. 2. It comprises a base or support element 11 having integrally mounted thereon, a circular cube receptacle or terminal base 12 which includes a circular groove 8a for receiving the four pairs of terminals 8b of the base 8c of a cube 8, as well as a central socket 13, with a pair of terminals for receiving a central projection 8d underneath base 12. The base 12 receptacle, per se, is well known in the art.

In accordance with the present invention, such base 12 is integrally secured to support element 11, preferably made of plastic material, which has secured underneath thereof and integrally with the bottom surface an angularly depending leg 14 having two electrical lead-in wires 15, 16 molded therein which wires have terminals 17 and 18 protruding from opposite sides of leg 14. The adapter 10 has provided, on the end of support 11, an integral channeled edge 20 which normally extends from the top of the housing 2 to serve as a stop member for limiting downward movement of the housing 2 into the camera.

In order to assure centering of the leg 14 with respect to housing 2, integral side walls 21 are provided at each end of the channeled portion 20 to limit sideward movement of support element 3 with respect to the tongue 23.

The adapter 10 is attached to housing 2 by first hooking channeled portion 20 onto tongue 23 while the element 11 extends therefrom slightly upwardly at an angle. Element 11 is then pivoted downwardly about tongue as a center until leg 14 is slid into housing 2 to insure that contact terminals 17 and 18 make good contact with the spring or yieldable contacts 4 and 5 at which time support element 11 rests flatly on top of the housing 2 as shown more clearly in FIG. 1. In this position notch 19 in leg 14 provides a stop to limit downward movement of the housing 2.

Cube 8, comprising four separate reflectors 9 and bulbs (not shown) on each side of the cube is then plugged into receptacle 12 in a known manner.

In operation, when the assembly is in place as shown in FIG. 1, upon snapping of a picture, contact is made so as to flash the particular flash bulb which extends forwardly of the camera. Then before the next picture can be taken, the flash cube must be manually turned ¼ turn so that the next reflector and bulb will be placed forwardly on the camera in readiness for taking the next flash picture. This operation is continued until all four flash bulbs are consumed. Then it will be necessary to remove the flash cube 8 and replace it with another.

Of course, the number of flash bulbs and reflectors may be more or less than four, if so desired by using a shape other than a cube, such as a heptagon or octagon. Furthermore, while the reflector housing built-into the camera is shown as being lifted from the top, it may instead be lifted from either side of the camera 1.

When it is desired to restore the camera to its original condition, all that is necessary is to lift leg 14 by tilting it about tongue 23 as a center until the channeled edge of the adapter clears and is detached from tongue 23.

Thus it will be seen that I have provided a highly efficient adapter of simple and inexpensive construction which may be easily and quickly attached to a conventional reflector housing of a Kodak Instamatic camera, or any similar camera that houses a single flash bulb, so as to enable the use of a flash cube to permit taking of four consecutive flash pictures before the flash cube has to be replaced.

While I have illustrated and described a single specific embodiment of my invention, it will be understood that this is by way of illustration only, and that various changes and modifications may be made within the contemplation of my invention.

I claim:

1. For use in combination with a camera having a box-like reflector housing with spring electrical contacts disposed at the base of a reflector in the housing for reception of flash bulb electrical contacts; the improvement comprising an adapter having a base on which is integrally mounted a circular receptacle with contacts for receiving a plurality of pairs of contacts of a flash unit having a plurality of reflectors and flash bulbs along the sides thereof, said adapter base terminating in a channeled edge portion adapted to be fitted onto a tongue portion at the top of the reflector housing, said adapter having a depending leg with contacts extending therealong terminating in a pair of terminals adapted to make contact with said spring electrical contacts, whereby the camera may take successive flash pictures.

2. An adapter as recited in claim 1 wherein said channeled edge portion is provided with end walls so as to automatically center the adapter leg with respect to the reflector housing so as to insure the making of contacts between said adapter terminals and said spring contacts.

References Cited

UNITED STATES PATENTS

| | | | |
|---|---|---|---|
| 3,353,465 | 11/1967 | Peterson et al. | 95—11.5 |
| 3,400,261 | 9/1968 | Jacob | 240—1.3 |

NORTON ANSHER, Primary Examiner

F. L. BRAUN, Assistant Examiner

U.S. Cl. X.R.

95—11.5; 240—37; 95—11